(12) United States Patent
Yuki

(10) Patent No.: US 7,290,044 B2
(45) Date of Patent: Oct. 30, 2007

(54) DEVICE INFORMATION RENEWAL SYSTEM

(75) Inventor: Tsutomu Yuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 605 days.

(21) Appl. No.: 10/119,953

(22) Filed: Apr. 11, 2002

(65) Prior Publication Data

US 2002/0165984 A1    Nov. 7, 2002

(30) Foreign Application Priority Data

Apr. 13, 2001 (JP) ............................. 2001-115539
Sep. 3, 2001 (JP) ............................. 2001-266551
Apr. 5, 2002 (JP) ............................. 2002-104382

(51) Int. Cl.
*G06F 15/173* (2006.01)

(52) U.S. Cl. .................................... 709/223; 709/228

(58) Field of Classification Search .................... 710/8, 710/16; 709/221, 233, 223, 228, 224, 238, 709/250; 713/1; 358/296, 1.15, 1.16, 1.17, 358/1.6, 358, 1.18; 370/401, 202, 392, 4; 707/104.1, 1, 202

See application file for complete search history.

(56) References Cited

U.S. PATENT DOCUMENTS

| | | | | |
|---|---|---|---|---|
| 5,841,991 A | * | 11/1998 | Russell | 709/221 |
| 5,991,828 A | * | 11/1999 | Horie et al. | 710/8 |
| 6,862,286 B1 | * | 3/2005 | Tams et al. | 370/401 |
| 6,967,734 B1 | * | 11/2005 | Wang et al. | 358/1.15 |
| 2002/0069269 A1 | * | 6/2002 | Simpson | 709/220 |

* cited by examiner

*Primary Examiner*—Matthew C. Bella
*Assistant Examiner*—Mike Rahmjoo
(74) *Attorney, Agent, or Firm*—Dickstein Shapiro LLP

(57) ABSTRACT

A device information renewal system comprises a storing unit which receives, with a computer terminal being connected to a first network, a device information of image forming devices on the first network, including a network address, a model name and an option composition data, the device information being stored as old device information in a memory of the terminal. A comparison unit receives, when the terminal is connected to a second network, a new device information of image forming devices on the second network and the old network information, and determines whether the new device information matches with the old device information. A renewal unit renews the old device information stored in the terminal, in accordance with the new device information when it is determined that the new device information matches with the old device information.

15 Claims, 16 Drawing Sheets

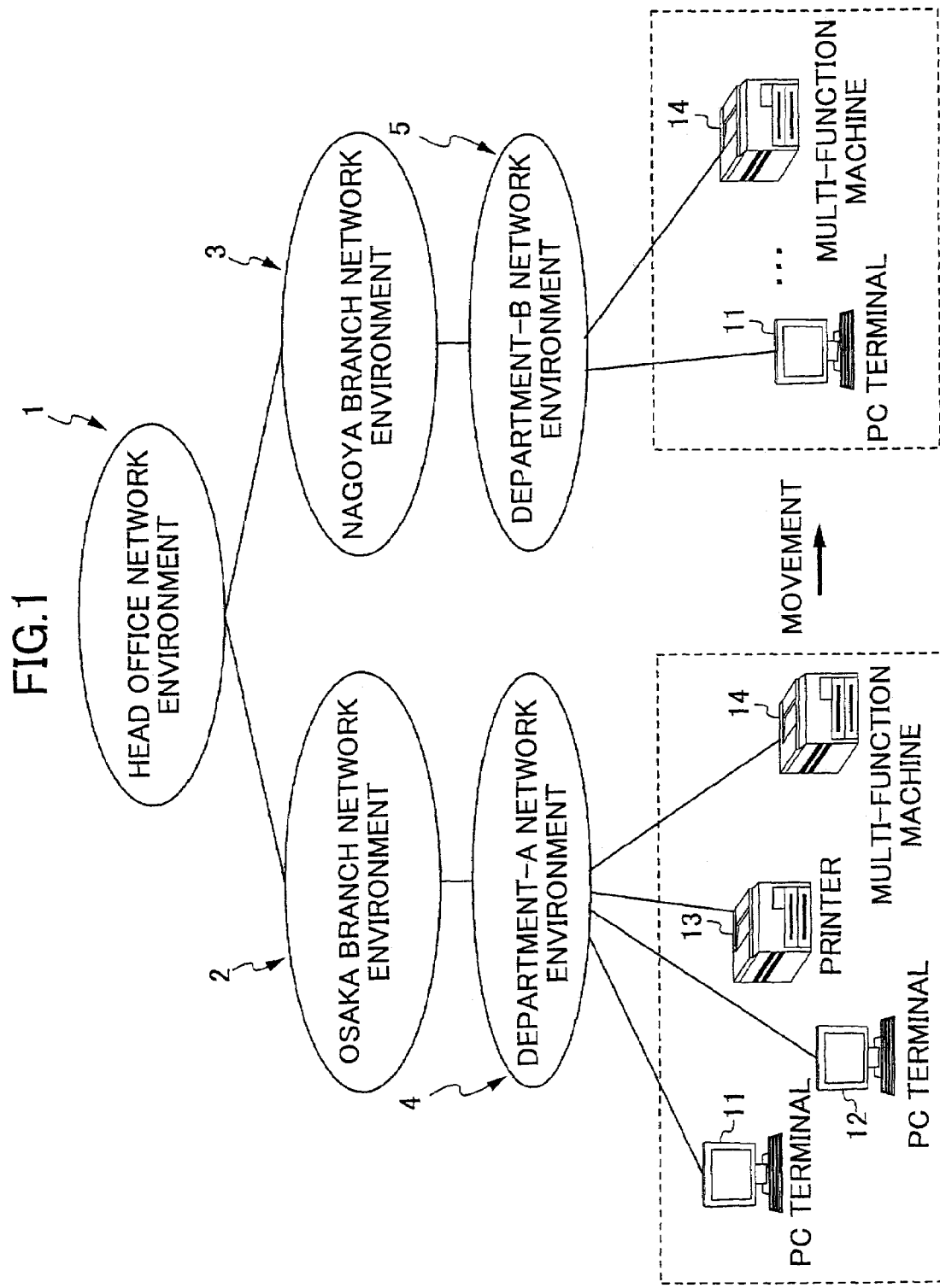

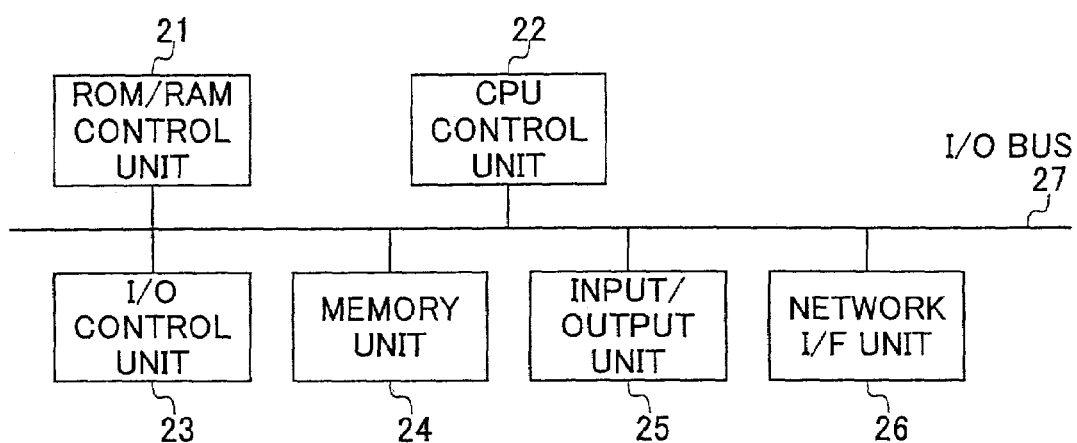
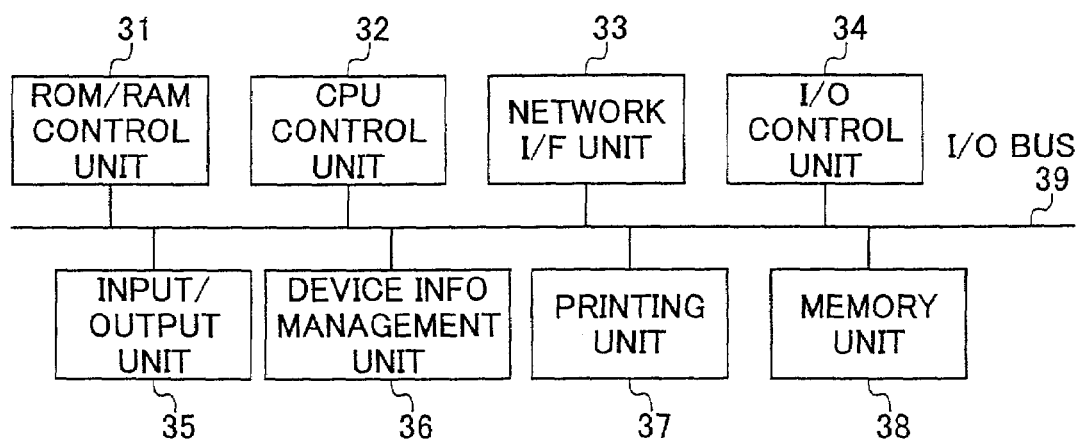

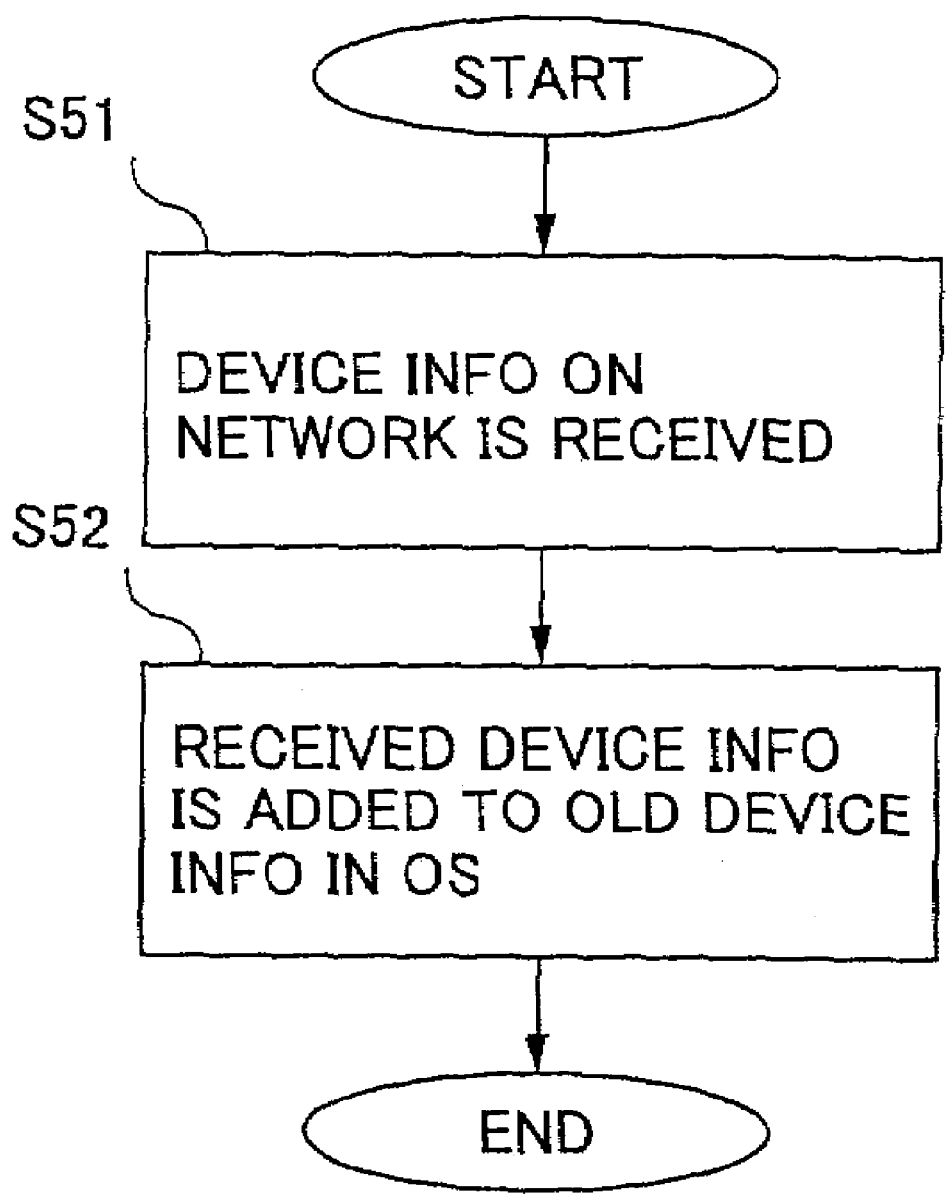

FIG.7

(a)
PRINTER INFORMATION ON NETWORK

| IP ADDRESS | MAC ADDRESS | PRINTER NAME (NIC) | MODEL ID | OPTIONS | ... |
|---|---|---|---|---|---|
| 11.22.33.10 | 001122334455501 | PRINTER1 | MODEL_A | TRAY 1,2,3/ DUAL | ... |
| 11.22.33.22 | 001122334455503 | PRINTER3 | MODEL_A | TRAY 1,2,3/ DUAL/FAX/COPY | ... |
| 11.22.33.20 | 001122334455504 | PRINTER4 | MODEL_B | TRAY 1,2/ COLOR | ... |
| ... | ... | ... | ... | ... | ... |

(b)
PRINTER INFORMATION REGISTERED IN OS

| PRINTER NAME | MODEL ID | IP ADDRESS (PORT No.) | OPTIONS | ... |
|---|---|---|---|---|
| PRN_A | MODEL_A | 11.22.33.10 | TRAY 1,2,3/ DUAL | ... |
| PRN_B | MODEL_A | 11.22.33.22 | TRAY 1,2,3/ DUAL/FAX/COPY | ... |
| PRN_C | MODEL_B | 11.22.33.20 | TRAY 1,2/ COLOR | ... |
| ... | ... | ... | ... | ... |

FIG.8

(a) PRINTER INFORMATION ON NETWORK

| IP ADDRESS | MAC ADDRESS | PRINTER NAME (NIC) | MODEL ID | OPTIONS | ... |
|---|---|---|---|---|---|
| 33.44.55.10 | 00112233445501 | PRINTER1 | MODEL_A | TRAY 1,2,3/ DUAL | ... |
| 33.44.55.11 | 00112233445502 | PRINTER2 | MODEL_A | TRAY 1,2,3 | ... |
| 33.44.55.22 | 00112233445503 | PRINTER3 | MODEL_A | TRAY 1,2/ DUAL/FAX/COPY | ... |
| ... | ... | ... | ... | ... | ... |

(b) NON-INSTALLED PRINTER INFORMATION

| IP ADDRESS | MAC ADDRESS | PRINTER NAME (NIC) | MODEL ID | OPTIONS | ... |
|---|---|---|---|---|---|
| 11.22.33.20 | 00112233445504 | PRINTER4 | MODEL_B | TRAY 1,2/ COLOR | ... |
| ... | ... | ... | ... | ... | ... |

(c) PRINTER INFORMATION REGISTERED IN OS

| PRINTER NAME | MODEL ID | IP ADDRESS (PORT No.) | OPTIONS | ... |
|---|---|---|---|---|
| PRN_A | MODEL_A | 33.44.55.10 | TRAY 1,2,3/ DUAL | ... |
| PRN_B | MODEL_A | 33.44.55.22 | TRAY 1,2/ DUAL/FAX/COPY | ... |
| PRN_D | MODEL_A | 33.44.55.11 | TRAY 1,2,3 | ... |
| ... | ... | ... | ... | ... |

FIG.9

| SELECT | IP ADDRESS | MODEL ID | MAC ADDRESS | REMARKS |
|---|---|---|---|---|
| ● | 11.22.33.5 | NX720 | 00:00:74:11:22 | 7TH FL. WINDOW |
| ○ | 11.22.33.7 | NX720 | 00:00:74:11:22 | 7TH FL. PASSAGE |

PLURAL PRINTERS HAVING SAME MODEL ID ON NETWORK.
PLEASE SELECT ONE OF THESE PRINTERS.
DOUBLE-CLICK ITEM THAT YOU WISH TO VIEW PRINTER
INFO.

[ OK ]  [ CANCEL ]

FIG.10

IP ADDRESS: 11.22.33.55
MODEL ID: NX720
MAC ADDRESS: 00:00:74:11:22:33
REMARKS: 7TH FL. WINDOW

| TRAY NAME | SIZE | PAPER TYPE |
|---|---|---|
| TRAY1 | A4 LONGITUD. | PLAIN PAPER |
| TRAY2 | A4 LATERAL | PLAIN PAPER |
| TRAY3 | A4 LONGITUD. | REPRODUCED |

- SYSTEM
- SUPPLY PAPER TRAY
- EJECT SHEET TRAY
- TONER
- OPTIONS
- NETWORK

DEVICE INFORMATION RENEWAL SYSTEM

BACKGROUND OF THE INVENTION

1. Field of the Invention

The present invention relates to a device information renewal system that is capable of renewing automatically device information of image forming devices, such as printers or copiers, which is registered into the operating system of a computer at the time of movement of the computer to a new network environment or at the time of layout change of the image forming devices.

2. Description of the Related Art

In recent years, the network technology, such as the local area network (LAN), is commonly used in restricted places such as the inside of corporate offices, buildings or campuses, and various computers and image forming devices, such as printers, copiers or. scanners, are connected to such network environment, which enables information exchange, sharing of information, sharing of the image forming equipment, etc.

When newly connecting a computer and its peripheral equipment to such network environment, the user needs to perform the setting of network parameters of each device (a server or a printer), such as the network address which indicates the position of each device in the network, by using the classification of the device, the type of the connection device usable in the network, the setting and procedure of the network. The setting of network parameters must be performed when the computer and its peripheral equipment are moved to a new network, or the network environment is changed or the layout change is needed.

For example, when the layout change is needed, it is necessary to move the PC (personal computer) terminal and the shared image forming equipment (such as printers, copiers or multi-function machines) from the old network to the new network. In such a case, the network address (e.g., IP address) of the PC terminal and other parameters (such as the installation place and the administrator name) with respect to the old network must be renewed with respect to the new network. The user has to perform the setting of such network parameters of the PC terminal and the shared image forming equipment.

In order to reduce the user's burden when performing the setting of network parameters, the DHCP (Dynamic Host Configuration Protocol) has been proposed as the automatic acquisition function of the network address (IP address) used as the host address of PC terminal and its peripheral equipment. This protocol is used to perform automatically assignment of the IP address of each device in a network, that is, the setting of network parameters.

However, even when the DHCP is used as the automatic acquisition function of the network address, it depends on the OS (operating system) of the computer. For example, it is necessary to change the setting of the port number of the host address to information setup (property information on the printer registered into the printer folder etc.) of the printer registered in the OS. The network administrator or each user's manual setting operations must be performed, and the burden of the network administrator or each user is significantly large.

Moreover, when a PC terminal is moved to a new network, the device information of a printer registered the OS of the PC terminal corresponds to the old network environment before the movement, and the user must perform the setting of network parameters suited to the new network. When the acquisition of a MAC (Media Access Control) address, a printer model name, etc. is not performed, the user must perform the setting of network parameters suited to the new network in which the PC terminal is actually connected. The user must perform the manual setting operation to make a setting change of the port name of the host address to the device information of the printer registered in the OS of the PC terminal after the movement of network environment, and each user's burden is large.

After the movement of network environment, when the device information of the printer registered in the OS of the PC terminal is not updated, even if printing is possible, it is problematic that the user must go to the printer of the new network environment to use printing paper. If the user does not go to use the printing paper at the printer, the printing paper becomes a waste of resources. When the device information of the printer registered in the OS of the PC terminal is not updated and a printing demand is not accepted in the new network environment, it means that the user has done useless printing work on the other hand.

SUMMARY OF THE INVENTION

An object of the present invention is to provide an improved device information renewal system in which the above-described problems are eliminated.

Another object of the present invention is to provide a device information renewal system that efficiently renews the device information of image forming devices registered in the operating system of a computer, after the computer is moved to a new network.

Another object of the present invention is to provide a device information renewal method that efficiently renews the device information of image forming devices registered in the operating system of a computer, after the computer is moved to a new network.

The above-mentioned objects of the present invention are achieved by a device information renewal system for use in a network in which a computer terminal and image forming devices are connected, the device information renewal system comprising: a storing unit which receives, with the terminal being connected to a first network, device information of image forming devices on the first network, including a network address and a MAC address of each device, the device information being stored in a memory of the terminal as old device information; a comparison unit which receives, when the terminal is connected to a second network, new device information of image forming devices on the second network and the old network information from the storing unit, and determines whether the new device information matches with the old device information; and a renewal unit which renews the old device information stored in the memory of the terminal, in accordance with the new device information when it is determined that the new device information matches with the old device information.

The above-mentioned objects of the present invention are achieved by a device information renewal system for use in a network in which a computer terminal and image forming devices are connected, the device information renewal system comprising: a storing unit which receives, with the terminal being connected to a first network, device information of image forming devices on the first network, including a network address, a model name and an option composition data of each device, the device information being stored in a memory of the terminal as old device information; a comparison unit which receives, when the terminal is connected to a second network, a new device information of image forming devices on the second network and the old network information from the storing unit, and determines whether the new device information matches with the old device information; and a renewal unit which renews the old device information stored in the memory of the terminal, in accordance with the new device information when it is determined that the new device information matches with the old device information.

The above-mentioned objects of the present invention are achieved by a device information renewal method for use in a network in which a computer terminal and image forming devices are connected, the device information renewal method comprising the steps of: storing, with the terminal being connected to a first network, device information of image forming devices on the first network, including a network address and a MAC address of each device, the device information being stored in a memory of the terminal as old device information; receiving, when the terminal is connected to a second network, new device information of image forming devices on the second network and the old network information from the memory of the terminal; determining whether the new device information matches with the old device information; and renewing the old device information stored in the memory of the terminal, in accordance with the new device information when it is determined that the new device information matches with the old device information.

The above-mentioned objects of the present invention are achieved by a device information renewal method for use in a network in which a computer terminal and image forming devices are connected, the device information renewal method comprising the steps of: storing, with the terminal being connected to a first network, device information of image forming devices on the first network, including a network address, a model name and an option composition data of each device, the device information being stored in a memory of the terminal as old device information; receiving, when the terminal is connected to a second network, a new device information of image forming devices on the second network and the old network information from the memory of the terminal; determining whether the new device information matches with the old device information; and renewing the old device information stored in the memory of the terminal, in accordance with the new device information when it is determined that the new device information matches with the old device information.

In the device information renewal system and method according to the present invention, the device information of image forming devices registered in the operating system of the computer terminal is received before the movement to the new network environment. After the movement of the computer terminal to the new network, the device information renewal system and method of the present invention receives the device information of the image forming devices on the new network and stores the received device information in the memory of the computer terminal temporarily. The device information renewal system and method of the present invention can automatically renew the device information of the image forming devices, registered in the operating system of the computer terminal, based on the comparison result of the old device information and the new device information. Accordingly, it is possible for the present invention to reduce the network administrator or each user's burden when moving the computer from the old network to the new network.

BRIEF DESCRIPTION OF THE DRAWINGS

Other objects, features and advantages of the present invention will be apparent from the following detailed description when read in conjunction with the accompanying drawings.

FIG. 1 is a diagram showing a network environment in which the device information renewal system of the present invention is provided.

FIG. 2 is a block diagram of a PC terminal in which the device information renewal system of the present invention is provided.

FIG. 3 is a block diagram of a printer which is connected to a network together with the PC terminal shown in FIG. 2.

FIG. 5A and FIG. 5B are flowcharts for explaining a device information renewal processing procedure that is executed by a second preferred embodiment of the device information renewal system of the invention.

FIG. 7 is a diagram for explaining the contents of device information of a printer connected to an old network environment before a computer is moved to a new network environment, and the contents of device information registered in the operating system of the computer.

FIG. 8 is a diagram for explaining the contents of device information of a printer connected to a new network environment after a computer is moved to the new network environment, and the contents of device information registered in the operating system of the computer.

FIG. 9 is a diagram showing a selection screen that is displayed when there are plural device information items in the device information renewal processing in FIG. 5A.

FIG. 10 is a diagram showing a reference screen that is displayed when one of the device information items is selected by the user on the selection screen in FIG. 9.

DETAILED DESCRIPTION OF PREFERRED EMBODIMENTS

Figure 4A:
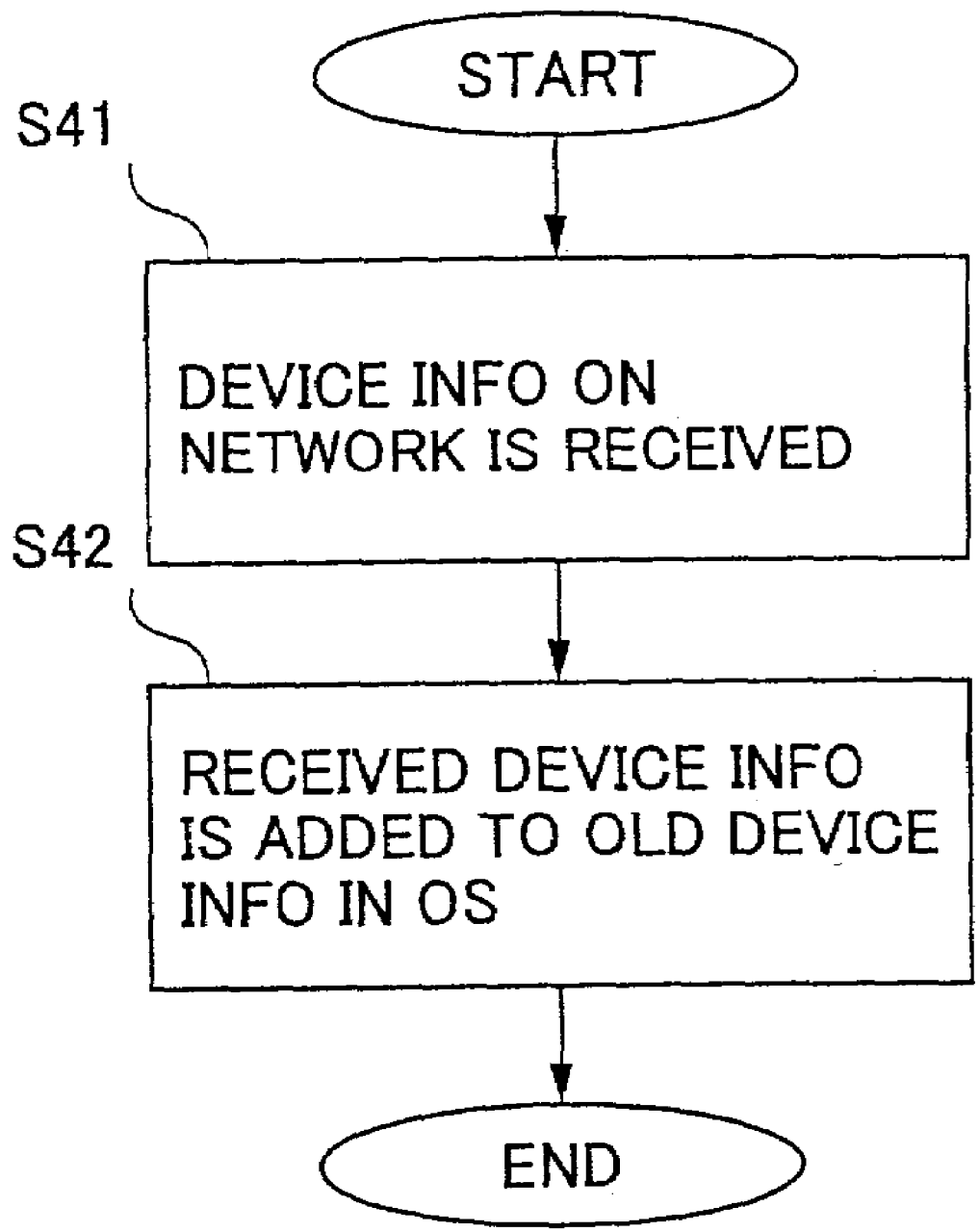
FIG. 4A and FIG. 4B are flowcharts for explaining a device information renewal processing procedure that is executed by a first preferred embodiment of the device information renewal system of the invention.

A description will now be provided of preferred embodiments of the present invention with reference to the accompanying drawings.

FIG. 1 shows a network environment in which the device information renewal system of the present invention is provided.

In the network environment in FIG. 1, the Osaka branch network environment 2 and the Nagoya branch network environment 3 are connected to the head office network environment 1, and the department-A network environment 4 is connected to the Osaka branch network environment 2, and the department-B network environment 5 is connected to the Nagoya branch network environment 3. In the following, the case where the department-A network environment 4 of the Osaka branch network environment 2 is moved to the department-B network environment 5 of the Nagoya branch network environment 3 will be described.

In the department-A network environment 4 of the Osaka branch network environment 2, the PC (personal computer) terminals 11 and 12, the printer 13, and the multi-function machine 14 are connected. Although it is not shown in FIG. 1, all the image forming devices are moved to the department-B network environment 5. It is supposed that not only two or more PC terminals but also the printers are installed in the department-B network environment 5.

FIG. 2 shows the configuration of a PC terminal in which the device information renewal system of the present invention is provided. In FIG. 2, the configuration of the PC terminal 11 is taken as an example but it is supposed that the PC terminal 12 has the same configuration as that of the PC terminal 11.

As shown in FIG. 2, in the PC terminal 11, a ROM/RAM control unit 21, a CPU (central processing unit) control unit 22, an I/O (input and output) control unit 23, a memory unit 24, an input/output unit 25, and a network I/F (interface) unit 26 are provided. These elements of the PC terminal 11 are interconnected by an I/O bus 27.

The ROM/RAM control unit 21 controls the memories, such as a ROM (read-only memory) or a RAM (random access memory) in the memory unit 24. The program code and data which control operation of the PC terminal 11 are stored in the ROM. The RAM functions as the main memory of the CPU (central processing unit), and is used under the control of the program code and the data code.

The CPU control unit 22 includes the CPU of the PC terminal 11, and controls the various programs connected to the system bus, and accesses various devices in accordance with the program code stored in the ROM.

The I/O control unit 23 controls the input and output of the data in the memory unit 24, the input/output unit 25, and the network I/F unit 26.

The memory unit 24 stores the OS (the operating system), and includes the ROM, the RAM, other memories, and a HDD (hard disk drive), and controls each of the memories and the HDD. Moreover, the device information of image forming devices, such as printers, connected to the network environment, is registered into the OS of the memory unit 24.

The input/output unit 25 controls the input/output devices, such as the keyboard or the mouse or the display unit of the PC terminal 11.

The network I/F unit 26 controls data communications with external image forming devices, such as the printer 13 or the multifunction machine 14, which are connected to the network through the LAN card.

FIG. 3 shows the configuration of a printer which is connected to the network together with the PC terminal in FIG. 2. In FIG. 3, the configuration of the printer 13 will be described, but it is supposed that the multi-function machine 14 or other image forming devices have a configuration that is essentially the same as that of the printer 13.

As shown in FIG. 3, in the printer 13, a ROM/RAM control unit 31, a CPU control unit 32, a network I/F unit 33, an input/output unit 34, an I/O control unit 35, a device information management unit 36, a printing unit 37 and a memory unit 38 are provided, and these elements of the printer 13 are interconnected by an I/O bus 39.

The ROM/RAM control unit 31 controls various memories, such as a ROM and a RAM in the memory unit 38. A printing system program and data are stored in the ROM. The RAM functions as a main memory of the CPU, and is used under the control of the program code and the data code.

The CPU control unit 32 includes the CPU which controls the entire printer 13, and controls the various programs connected to the system bus, and accesses various devices in accordance with the printing system program code stored in the ROM.

The I/O control unit 35 controls the memory unit 38, the input/output unit 34, the network I/F unit 33, and the printing unit 37.

The network I/F unit 33 controls data communications with external devices, such as the PC terminals 11 and 12 and the multi-function machine 14, which are connected to the network through the LAN card.

The input/output unit 34 controls. the input and output of the operation panel (not shown in FIG. 3).

The memory unit 38 includes a mass storage device, such as a HDD, and performs control of the HDD. The printing unit 37 performs the printing of printing data. The device information management unit 36 manages the device information of the printer 13, such as a printer name, a model ID, a MAC (Media Access Control) address, a network address, and optional composition data.

Figure 4B:
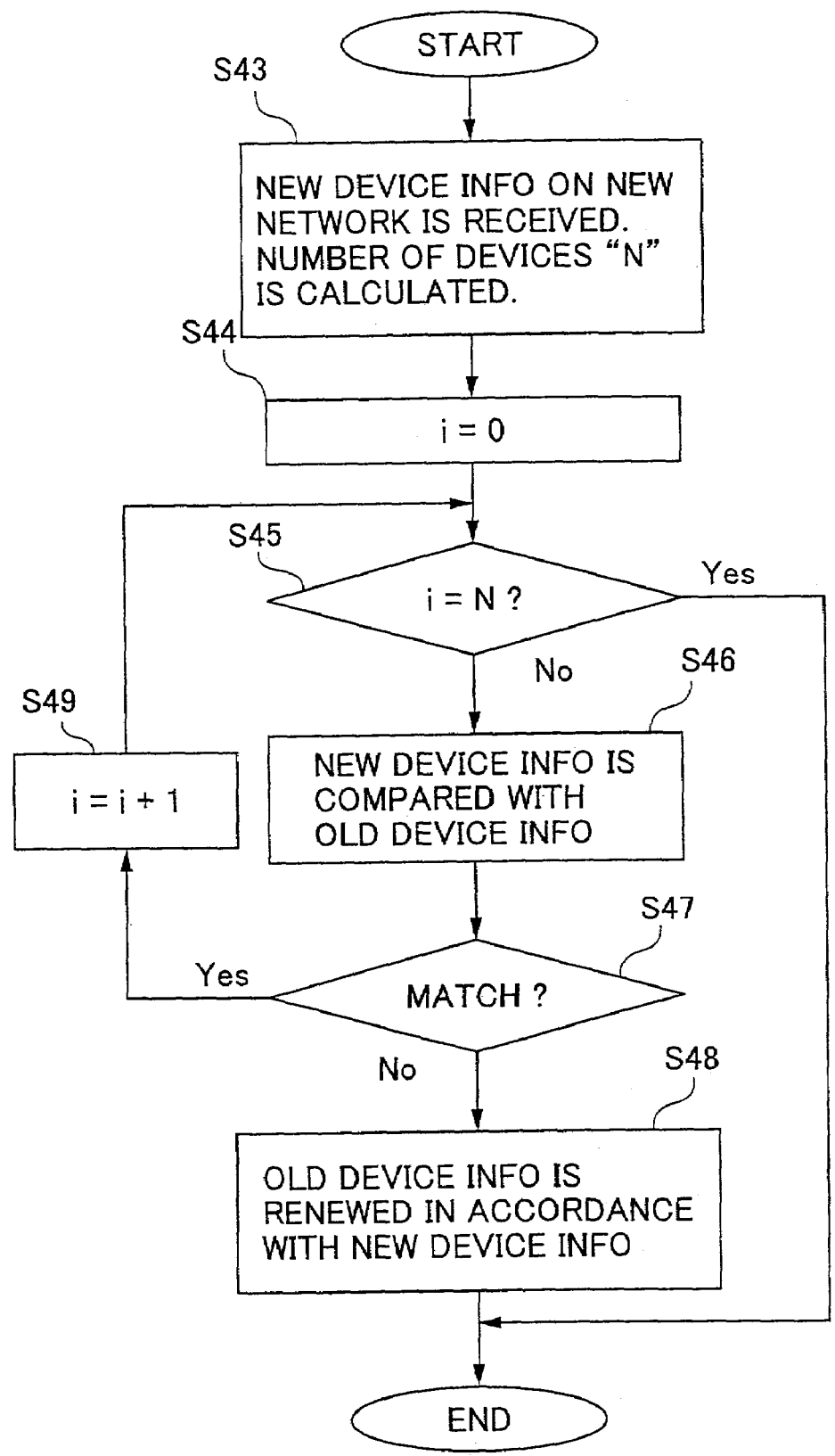

FIG. 4A and FIG. 4B show a device information renewal processing procedure which is performed by the first preferred embodiment of the device information renewal system of the present invention.

The device information renewal processing procedure in FIG. 4A is periodically or at arbitrary times performed by the control unit 22 when the PC terminal 11 is connected to the network environment (for example, the network environment 4) before the movement of the PC terminal 11 to the new network environment.

The device information renewal processing procedure in FIG. 4B is performed by the control unit 22 after the PC terminal 11 is moved to the new network environment (for example, the network environment 5).

Figure 6:
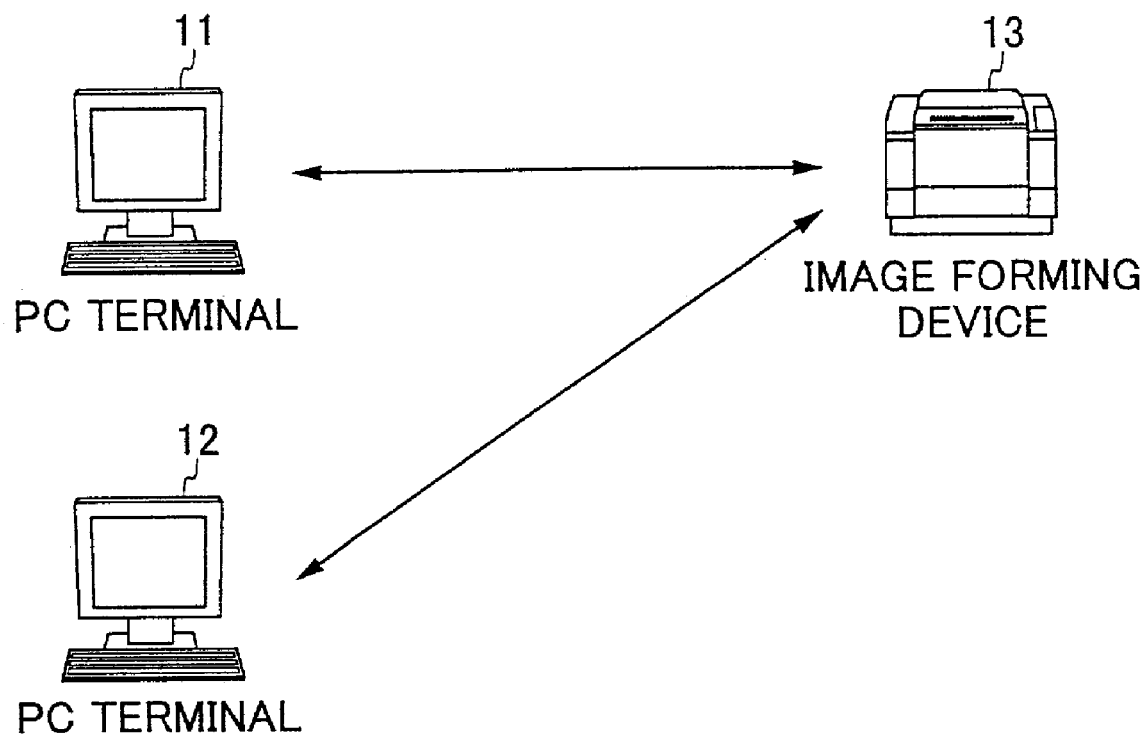
FIG. 6 is a diagram for explaining data communications performed between the PC terminal and the image forming device which are connected to the same network.

FIG. 6 shows the data communications performed between the PC terminal and the image forming device which are connected to the same network. FIG. 7 shows the contents of the device information of the printer connected to the old network environment before the PC terminal is moved to the new network environment, and the contents of the device information registered in the operating system of the PC terminal. FIG. 8 shows the contents of the device information of the printer connected to the new network environment after the PC terminal is moved to the new network environment, and the contents of the device information registered in the operating system of the PC terminal.

As shown in FIG. 6, each of the PC terminals 11 and 12 in the network concerned receives the device information of the image forming device 13 by performing data communications between the PC terminal and the image forming device through the network.

A description will now be given of the receiving of the device information by the PC terminal 11 before the PC terminal 11 is moved to a new network environment, with reference to FIG. 4A.

At a start of the procedure of FIG. 4A, the printer 13 receives a device information request from the PC terminal 11 through the network I/F unit 33 before the movement, and reads the device information from the device information management unit 36, and transmits the device information to the PC terminal 11. As shown in FIG. 7(a), the device information of the printer 13 on the department-A network environment 4 includes information items, such as the IP (Internet Protocol) address, the MAC (Media Access Control) address, the printer name (NIC), the model ID, and option composition data. Similarly, the multi-function machine 14 transmits the device information thereof to the PC terminal 11.

The PC terminal 11 stores in the memory of the memory unit 24 the received device information through the ROM/RAM control unit 21 when the device information of the image forming devices, such as the printer 13 and the multi-function machine 14, is received through the network I/F unit 26 (step S41).

Next, the PC terminal 11 reads out the device information registered in the OS of the memory unit 24, and stores in the memory of the memory unit 24 the received device information through the ROM/RAM control unit 21 (step S42). The PC terminal 11 adds the device information, received from the network, to the old device information registered in the OS of the memory unit 24 (step S42). Alternatively, the PC terminal 11 reads all the device information from the memory of the memory unit 24, and the device information is newly stored into the HDD of the memory unit 24 as the old device information.

In the above embodiment of the device information receiving procedure in FIG. 4A, the PC terminal 11 performs the data communications between the PC terminal 11 and each of the image forming devices on the network concerned, and automatically receives the device information sent by the device information management unit 36 of each device, respectively, and stores the received device information into the memory unit 24 of the PC terminal 11. The present invention is not limited to this embodiment. Alternatively, a network administrator or each user on the PC terminal 11 may manually input the device information of each of the image forming devices related to the network concerned, instead of using the PC terminal's automatic receiving function. In such alternative embodiment, when such device information is input by the network administrator, the PC terminal 11 stores the input device information into the memory unit 24 of the PC terminal 11.

As shown in FIG. 7(b), the device information registered in the OS of the memory unit 24 of the PC terminal 11 includes information items, including the printer name, the model ID, the IP address (port number), and the option composition data.

After the movement to the new network environment (the department-B network environment 5), the control unit 22 of the PC terminal 11 performs the device information renewal processing procedure in FIG. 4B.

At a start of the procedure in FIG. 4B, the PC terminal 11 transmits a device information request to the image forming devices (including the printer 13 and the multi-function machine 14 which have been moved from the department-A network environment 4) on the new network environment 5, through the network I/F unit 26. The printer 13 receives the device information request from the PC terminal 11 through the network I/F unit 33, and reads its device information from the device information management unit 36, and transmits the device information to the PC terminal 11. Moreover, other printers or copiers on the department-B network environment 5 transmit their device information to the PC terminal 11 similarly. The PC terminal 11 stores in the memory of the memory unit 24 the received device information as the new device information through the ROM/RAM control unit 21 when the device information of all the image forming devices on the new network is received through the network I/F unit 26 (step S43). Further, the PC terminal 11 calculates the number "N" of the image forming devices on the new network (step S43).

After the step S43 is performed, the PC terminal 11 resets the variable "i" to zero (step S44). The PC terminal 11 determines whether the value of the variable "i" is equal to the number "N" of the image forming devices on the new network (step S45).

When the result at the step S45 is affirmative (YES), it means that the checking of the device information of all the image forming devices is complete. At this time, the processing of FIG. 4B ends. When the result at the step S45 is negative (NO), the PC terminal 11 performs the following step S46, in order to check the device information of the corresponding device.

As shown in FIG. 8(a), the device information of a printer on the department-B network environment 5 includes information items, including the IP address, the MAC address, the printer name (NIC), the model ID, and the option composition data. In the step S46, the CPU control unit 22 of the PC terminal 11 reads out the old device information and the new device information, which are stored in the memory of the memory unit 24, through the ROM/RAM control unit 21, and compares the old device information (FIG. 7(a)) and the new device information (FIG. 8(a)). The PC terminal 11 determines whether a match between the old device information and the new device information occurs as the comparison result at the step S46 (step S47). The determination at the step S47 is made, for example, by checking that the MAC address of the new device information is in agreement with the MAC address of the old device information. Alternatively, if the same effect can be assumed, the determination at the step S47 may be made by comparison of another information item of the device information other than the MAC address.

A description will be given of the renewal procedure that is performed based on the comparison result of the old device information and the new device information in the present embodiment with reference to FIG. 7 and FIG. 8.

When the old device information of the printer having the printer name "PRINTER1" in FIG. 7(a) is compared with the new device information of each of the printers in FIG. 8(a), the MAC address "00112233445501" of the new device information of the printer having the printer name "PRINTER1" in FIG. 8(a) matches with the MAC address of the old device information of the printer having the printer name "PRINTER1" in FIG. 7(a). Hence, the device information registered in the OS of the memory unit 24 in this case is renewed in accordance with the new device information. In this case, it is determined that the printer is moved from the old network environment 4 to the new network environment 5, and the printer is connected to the new network environment 5.

Similarly, when the old device information of the printer having the printer name "PRINTER3" in FIG. 7(a) is compared with the new device information of each of the printers in FIG. 8(a), the MAC address "00112233445503"

of the new device information of the printer having the printer name "PRINTER3" in FIG. 8(a) matches with the MAC address of the old device information of the printer having the printer name "PRINTER3" in FIG. 7(a). Hence, the device information registered in the OS of the memory unit 24 in this case is renewed in accordance with the new device information. In this case, it is determined that the printer is moved from the old network environment 4 to the new network environment 5, and the printer is connected to the new network environment 5.

Similarly, when the old device information of the printer having the printer name "PRINTER4" in FIG. 7(a) is compared with the new device information of each of the printers in FIG. 8(a), each MAC address of the new device information of the printers in FIG. 8(a) does not match with the MAC address of the old device information of the printer having the printer name "PRINTER4" in FIG. 7(a). Hence, the renewal of the device information registered in the OS of the memory unit 24 is not performed in this case. In this case, the old device information of the printer from the old network environment 4 is stored as the non-installed device information as shown in FIG. 8(b). It is determined that the printer which was installed in the network environment 4 is not installed in the new network environment 5.

As shown in FIG. 4B, when a match between the old device information and the new device information occurs as the comparison result at the step S47, the PC terminal 11 renews the old device information registered in the OS of the memory unit 24 in accordance with the new device information (step S48).

In addition, after the renewal of the device information at the step S48 is performed, it is preferred that the CPU control unit 22 of the PC terminal 11 displays the renewal result on the display unit by using the input/output unit 25.

On the other hand, when the old device information and new device information are not in agreement as the comparison result at the step S47, the PC terminal 11 does not perform the renewal of the corresponding device information, and increments the variable "i" (step S49). After the step S49 is performed, the control of the PC terminal 11 is transferred to the above step S45, and the PC terminal 11 repeats performing the steps S45-S47 until the checking of the device information of all the image forming devices is complete.

As described above, the device information renewal system of the present embodiment receives the device information of the printers registered in the OS of the memory unit 24 before the movement to the new network environment. After the movement, the device information renewal system of the present embodiment receives the device information of the printers on the new network and stores the received device information in the memory of the memory unit 24 temporarily. The device information renewal system can automatically renew the device information of the printer, registered in the OS of the memory unit 24, based on the comparison result of the old device information and the new device information.

Figure 5B:
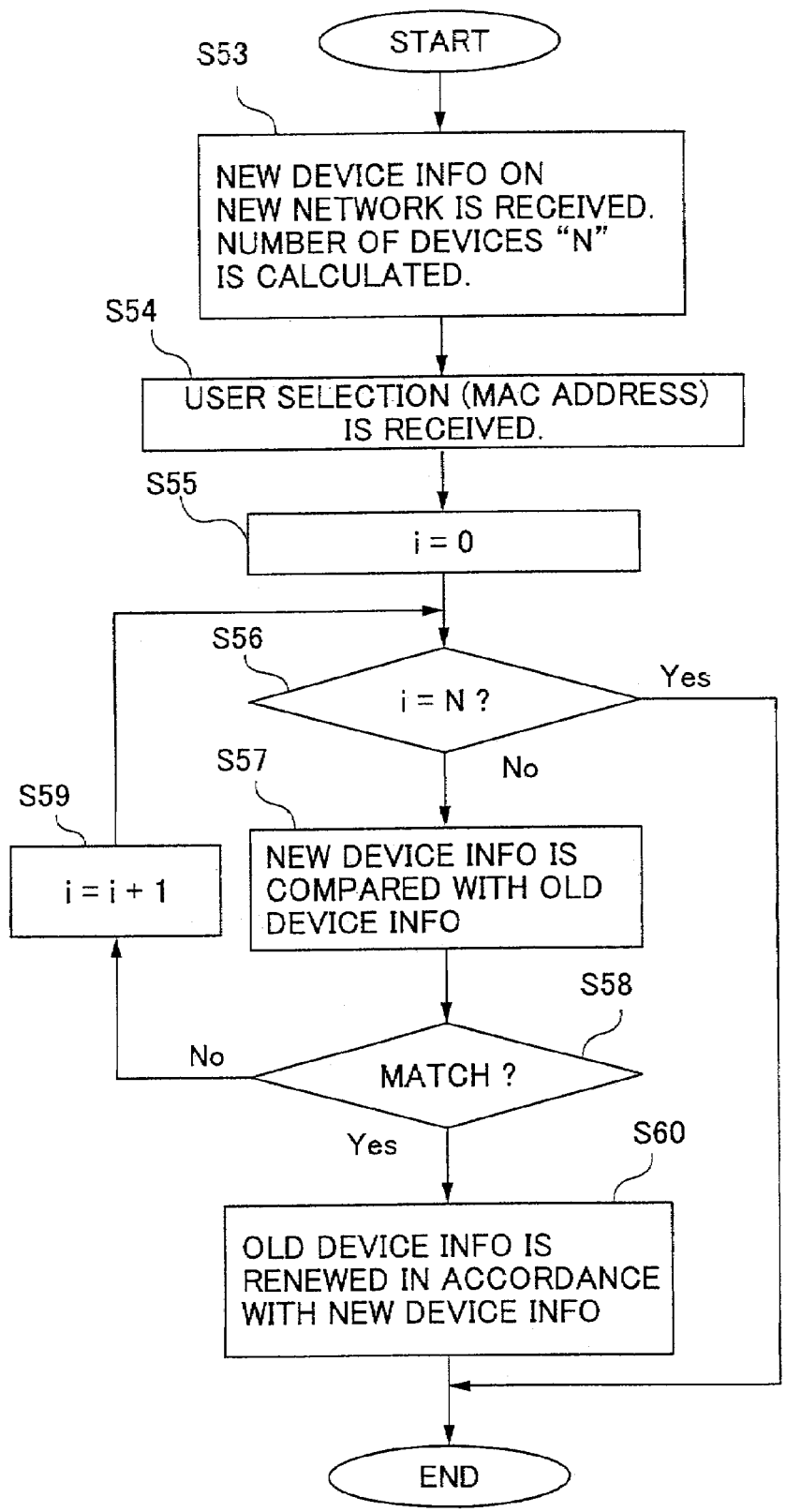

Next, FIG. 5A and FIG. 5B show a device information renewal processing procedure that is executed by the second preferred embodiment of the device information renewal system of the invention.

The device information renewal processing procedure in FIG. 5A is performed by the control unit 22 when the PC terminal 11 is connected to the network environment (for example, the network environment 4) and receives a printing demand to the printer 13 before the movement of the PC terminal 11 to the new network environment.

The device information renewal processing procedure in FIG. 5B is performed by the control unit 22 after the PC terminal 11 is moved to the new network environment (for example, the network environment 5), and it is connected to the new network environment and receives a printing demand to the printer 13.

At a start of the procedure of FIG. 5A, the printer 13 receives a device information request from the PC terminal 11 through the network I/F unit 33 before the movement, and reads the device information from the device information management unit 36, and transmits the device information to the PC terminal 11. Similarly, the multi-function machine 14 transmits the device information thereof to the PC terminal 11.

The PC terminal 11 stores in the memory of the memory unit 24 the received device information through the ROM/RAM control unit 21 when the device information of the image forming devices, such as the printer 13 and the multi-function machine 14, is received through the network I/F unit 26 (step S51).

Next, the PC terminal 11 reads out the device information registered in the OS of the memory unit 24, and stores in the memory of the memory unit 24 the received device information through the ROM/RAM control unit 21 (step S52). The PC terminal 11 adds the device information, received from the network, to the old device information registered in the OS of the memory unit 24 (step S52). Alternatively, the PC terminal 11 reads all the device information from the memory of the memory unit 24, and the device information is newly stored into the HDD of the memory unit 24 as the old device information.

In the above embodiment of the device information receiving procedure in FIG. 5A, the PC terminal 11 performs the data communications between the PC terminal 11 and each of the image forming devices on the network concerned, and automatically receives the device information sent by the device information management unit 36 of each device, respectively, and stores the received device information into the memory unit 24 of the PC terminal 11. The present invention is not limited to this embodiment. Alternatively, a network administrator or each user on the PC terminal 11 may manually input the device information of each of the image forming devices related to the network concerned, instead of using the PC terminal's automatic receiving function. In such alternative embodiment, when such device information is input by the network administrator, the PC terminal 11 stores the input device information into the memory unit 24 of the PC terminal 11.

After the movement to the new network environment (the department-B network environment 5), the control unit 22 of the PC terminal 11 starts execution of the device information renewal processing procedure in FIG. 5B.

At a start of the procedure in FIG. 5B, the PC terminal 11 transmits a device information request to the image forming devices (including the printer 13 and the multi-function machine 14 which have been moved from the department-A network environment 4) on the new network environment 5, through the network I/F unit 26. The printer 13 receives the device information request from the PC terminal 11 through the network I/F unit 33, and reads its device information from the device information management unit 36, and transmits the device information to the PC terminal 11. Moreover, other printers or copiers on the department-B network environment 5 transmit their device information to the PC terminal 11 similarly. The PC terminal 11 stores in the memory of the memory unit 24 the received device information as the new device information through the ROM/RAM control unit 21 when the device information of all the image forming devices on the new network is received through the network I/F unit 26 (step S53). Further, the PC terminal 11 calculates the number "N" of the image forming devices on the new network (step S53).

After the step S53 is performed, the PC terminal 11 displays a list of the plural printers of the new device information on the display unit through the input/output device 25, and receives the selection input (for example, the MAC address) from the list given by the user (step S54).

FIG. 9 shows a selection screen that is displayed when there are plural device information items in the device information renewal processing in FIG. 5B. At this time, the user selects by using the input device, such as the keyboard or the mouse, one device information from the list of the plural new device information items.

The PC terminal 11 stores in the memory of the memory unit 24 the selected device information through the ROM/RAM control unit 21 as the new device information (step S54). For example, the MAC address of the selected device information is stored into the memory.

FIG. 10 shows a reference screen that is displayed when one of the device information items is selected by the user on the selection screen in FIG. 9. The user can check the contents of the device information on the printer chosen with this reference screen.

After the step S54 is performed, the PC terminal 11 resets the variable "i" to zero (step S55). The PC terminal 11 determines whether the value of the variable "i" is equal to the number "N" of the image forming devices on the new network (step S56).

When the result at the step S56 is affirmative (YES), it means that the checking of the device information of all the image forming devices is complete. At this time, the processing of FIG. 5B ends. When the result at the step S56 is negative (NO), the PC terminal 11 performs the following step S57, in order to check the device information of the corresponding device.

In the step S57, the PC terminal 11 reads out the old device information and the new device information, which are stored in the memory of the memory unit 24, through the ROM/RAM control unit 21, and compares the old device information and the new device information. The PC terminal 11 determines whether a match between the old device information and the new device information occurs as the comparison result at the step S57 (step S58). The determination at the step S58 is made, for example, by checking that the MAC address of the new device information is in agreement with the MAC address of the old device information. Alternatively, if the same effect can be assumed, the determination at the step S58 may be made by comparison of another information item of the device information other than the MAC address.

As shown in FIG. 5B, when a match between the old device information and the new device information occurs as the comparison result at the step S58, the PC terminal 11 renews the old device information, registered in the OS of the memory unit 24, in accordance with the new device information (step S60).

In addition, after the renewal of the device information at the step S60 is performed, it is preferred that the PC terminal 11 displays the renewal result on the display unit by using the input/output unit 25.

On the other hand, when the old device information and new device information are not in agreement as the comparison result at the step S58, the PC terminal 11 does not perform the renewal of the corresponding device information, and increments the variable "i" (step S59). After the step S59 is performed, the control of the PC terminal 11 is transferred to the above step S56, and the PC terminal 11 repeats performing the steps S56-S58 until the checking of the device information of all the image forming devices is complete.

According to the second preferred embodiment of the present invention, when there is a printer which has not been installed after the movement to the new network environment and it is connected to the new network environment and the corresponding printer starts printing operation for the first time, the device information renewal processing procedure is performed in the same manner as in the previous embodiment. It becomes possible to update the device information on the corresponding printer promptly, and it can automatically renew the device information of the printer registered in the OS of the PC terminal 11, and can reduce the network administrator or each user's burden.

Figure 11:
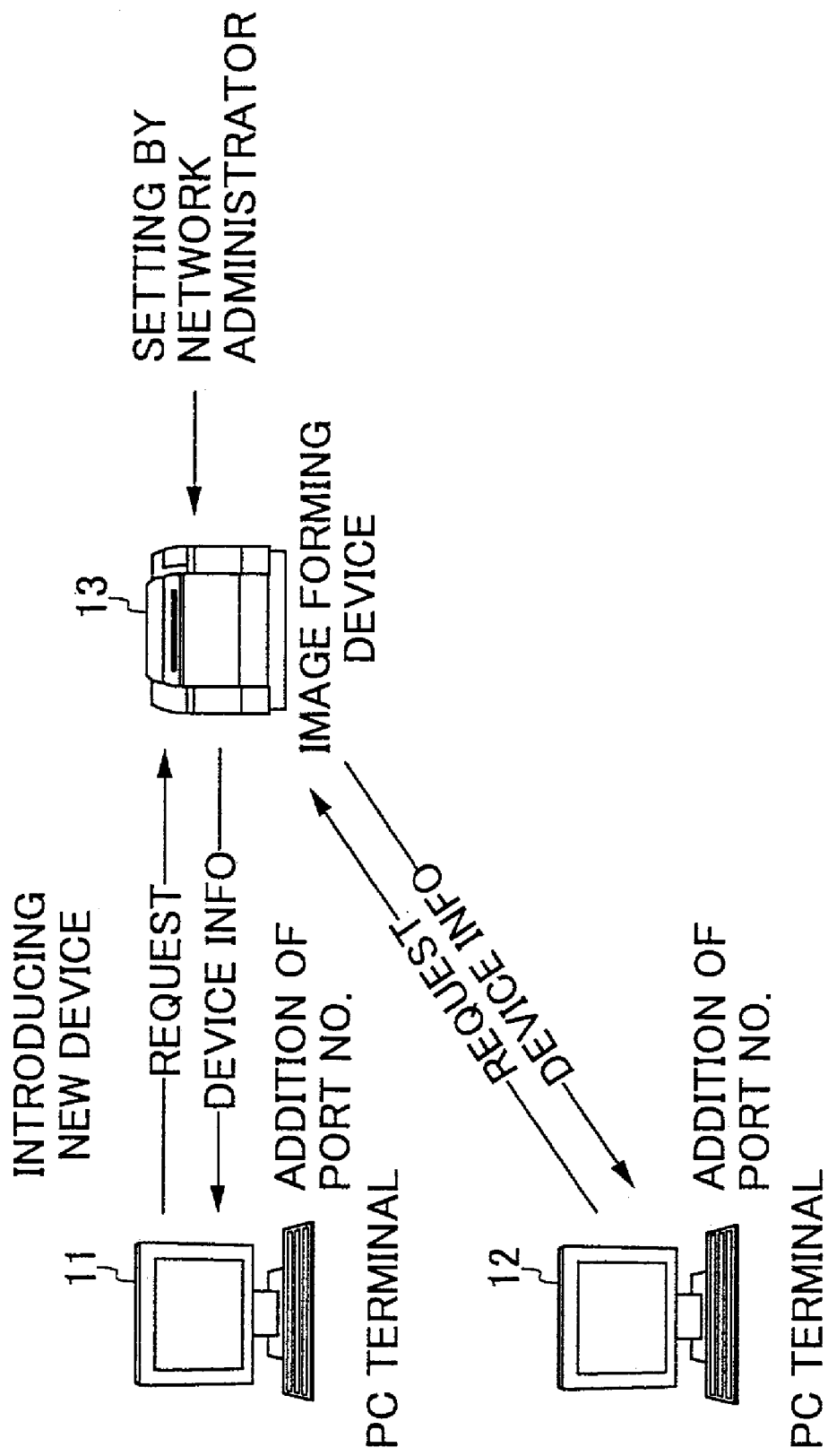
FIG. 11 is a diagram for explaining operation of the device information renewal system of the present invention when a new device is introduced into a network environment.

FIG. 11 shows operation of the device information renewal system of the present invention when a new device is introduced into the network environment.

As shown in FIG. 11, the network administrator performs the device information renewal processing procedure of FIG. 4A on the PC terminal 11, when a new device (for example a printer) 13' is introduced into the network concerned. When the PC terminal 11 transmits a device information request to the new device 13' through the network I/F unit 26, the new device 13' receives the request through the network I/F unit 33 as described above. In response to the request, the new device 13' transmits the device information, read from the device information management unit 36, to the PC terminal 11. The PC terminal 11 receives the device information of the new device 13' through the network I/F unit 26, and stores in the memory of the memory unit 24 the received device information through the ROM/RAM control unit 21. Furthermore, the PC terminal 11 adds the device information of the new device 13' to the old device information registered into the OS of the memory unit 24. Similarly, as for the PC terminal 12, the device information renewal procedure that is the same as that of the PC terminal 11 is performed.

Figure 12:
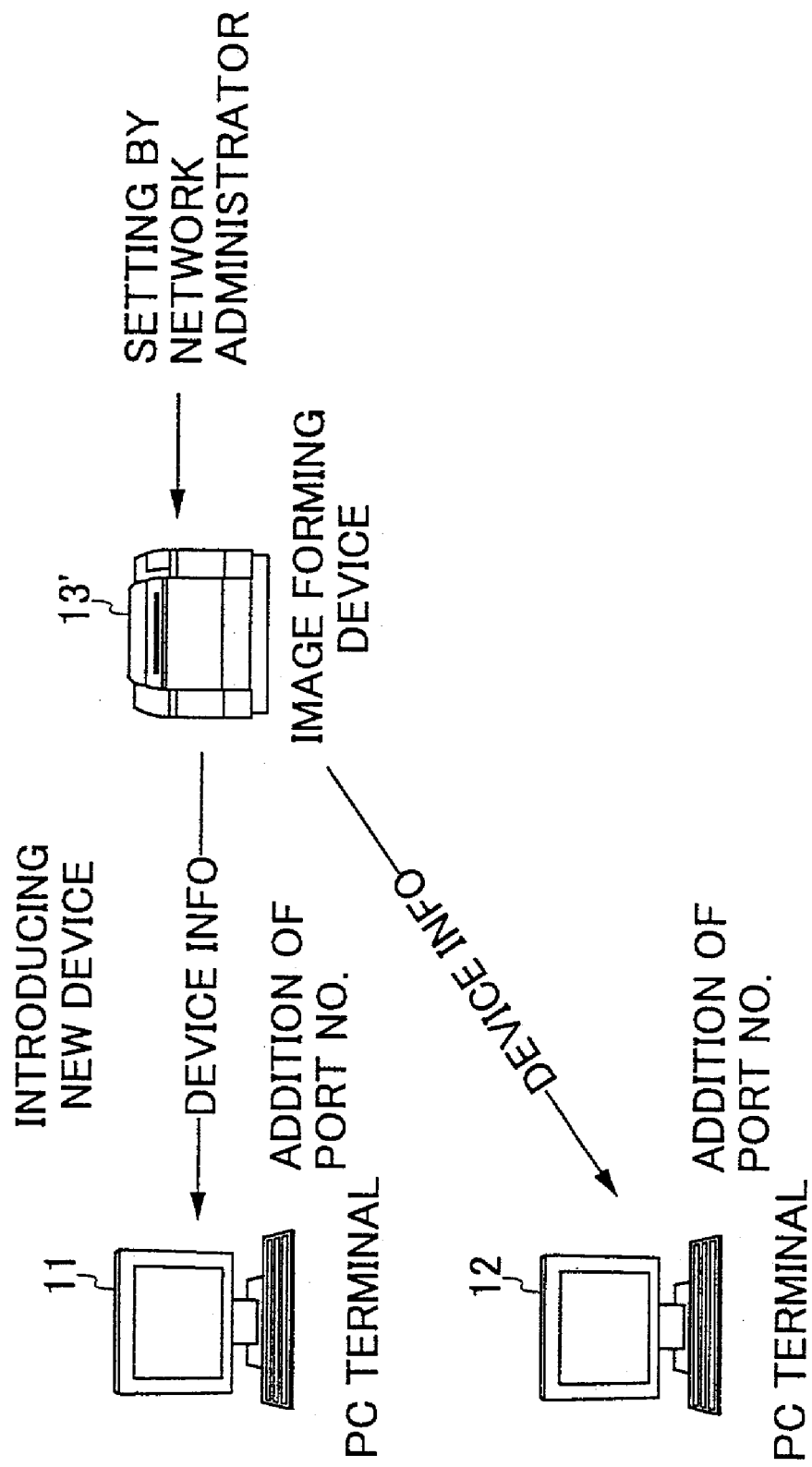
FIG. 12 is a diagram for explaining operation of the device information renewal system of the present invention when a new device is introduced into a network environment.

FIG. 12 shows operation of the device information renewal system of the present invention when a new device is introduced into the network environment.

In the above operation shown in FIG. 11, the PC terminal 11 transmits the device information request to the new device 13' through the network I/F unit 26. The present invention is not limited to this embodiment. Alternatively, as shown in FIG. 12, the new device may automatically transmit the device information to the PC terminal 11 or the PC terminal 12 when the new device 13' is introduced into the network concerned. Each of the PC terminals 11 and 12 receives the device information of the new device 13' and stores in the memory of the memory unit 24 the received device information through the ROM/RAM control unit 21.

Figure 13:
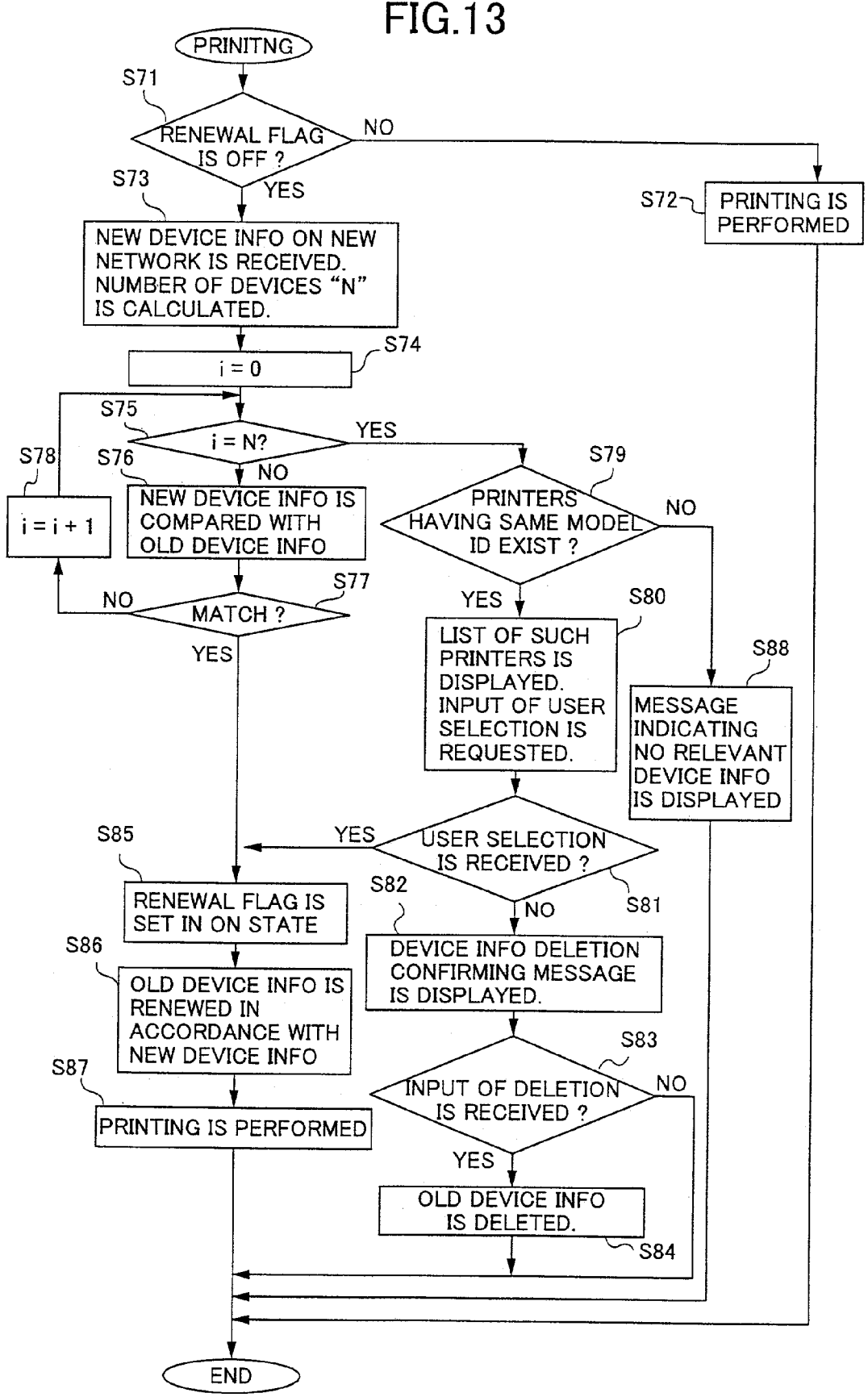
FIG. 13 is a flowchart for explaining a device information renewal processing procedure that is executed by a third preferred embodiment of the device information renewal system of the invention.

Next, FIG. 13 shows a device information renewal processing procedure that is executed by the third preferred embodiment of the device information renewal system of the present invention.

The execution of the device information renewal processing procedure in FIG. 13 is started by the CPU control unit 22 when the PC terminal 11 is moved to the new network environment (for example, the network environment 5) and connected to the new network and a printing demand to the printer 13 is received.

At a start of the device information renewal processing procedure in FIG. 13, the PC terminal 11 determines whether a renewal flag of the PC terminal 11 is OFF (step S71). The renewal flag in OFF state indicates that the old device information of the image forming devices registered with respect to the old network environment is not yet renewed after the movement to the network environment. When the result at the step S71 is negative (NO), it is determined that the device information is already renewed, and the PC terminal 11 performs printing operation of the printer 13 in response to the received printing demand (step S72). After the printing is performed, the procedure of FIG. 13 ends.

When the result at the step S71 is affirmative (YES), it is determined that the device information is not yet renewed. The PC terminal II transmits a device information request to each of the image forming devices (including the printer 13) over the network through the network I/F unit 26. The device information sent by each image forming device is received by the PC terminal 11, and the received device information is stored into the memory of the memory unit 24 through the ROM/RAM control unit 21 (step S73). Moreover, the PC terminal 11 calculates the number "N" of the image forming devices on the network (step S73).

After the step S73 is performed, the PC terminal 11 resets the variable "i" to zero (step S74). The PC terminal 11 determines whether the value of the variable "i" is equal to the number "N" of the image forming devices on the network (step S75).

When the result at the step S75 is affirmative (YES), it means that the checking of the device information of all the image forming devices is complete. The PC terminal 11 performs the following step S79, which will be described later.

When the result at the step S75 is negative (NO), the PC terminal 11 performs the following step S76, in order to check the device information of the corresponding device. In the step S76, the PC terminal 11 receives the old device information and the new device information, which are stored in the memory of the memory unit 24, through the ROM/RAM control unit 21, and compares the old device information and the new device information. Further, in the step S76, the PC terminal 11 determines whether a match occurs as the comparison result at the step S76 (step S77).

When the old device information and the new device information are in agreement as the result at the step S77, the PC terminal 11 sets the renewal flag in ON state (step S85). The PC terminal 11 renews the device information registered in the OS of the memory unit 24 in accordance with the new device information (step S86). After the step S86 is performed, the PC terminal 11 performs the printing operation of the printer 13 in response to the received printing demand (step S87). After the printing is performed, the procedure of FIG. 13 ends.

On the other hand, when the old device information and the new device information are not in agreement as the result at the step S77, the PC terminal 11 does not perform the renewal of the corresponding device information. The PC terminal 11 increments the variable "i" (step S78). And the control of the PC terminal 11 is transferred to the step S75, and the PC terminal 11 repeats performing the steps S75-S77 until the checking of the device information of all the image forming devices is complete.

When the result at the step S75 is affirmative (YES), the PC terminal 11 determines whether there are plural printers having the same device information item (for example, the model ID) as the old device information (step S79).

When the result at the step S79 is negative (NO), the PC terminal 11 displays a check message, which indicates there are no plural printers having the same device information item as the old device information, on the display unit through the input/output device 25 (step S88). After the step S88 is performed, the PC terminal 11 ends the processing of FIG. 13.

When the result at the step S79 is affirmative (YES), the PC terminal 11 displays a list of the plural printers of the new device information on the display unit through the input/output device 25, and waits for the input of the selection by the user (step S80).

The PC terminal 11 determines whether the user selects, using the keyboard or the mouse, one device information from the list of the plural printers of the new device information (step S81).

When the result at the step S81 is affirmative (YES), the PC terminal 11 stores the selected device information into the memory of the memory unit 24 through the ROM/RAM control unit 21 as the new device information, and the control of the PC terminal 11 is transferred to the above step S85.

When the result at the step S81 is negative (NO), the PC terminal 11 displays the deletion check message, which confirming the user to delete the old device information corresponding to each device information on the list of the plural printers, on the display unit through the input/output device 25, and waits for the input of the confirmation by the user (step S82). The PC terminal 11 determines whether the user inputs the confirmation to delete the corresponding old device information (step S83).

When the result at the step S83 is negative (NO), the PC terminal 11 ends the processing of FIG. 13 without performing the deletion of the old device information. On the other hand, when the result at the step S83 is affirmative (YES), the PC terminal 11 deletes the old device information (step S84). After the step S84 is performed, the procedure of FIG. 13 ends.

Figure 14:
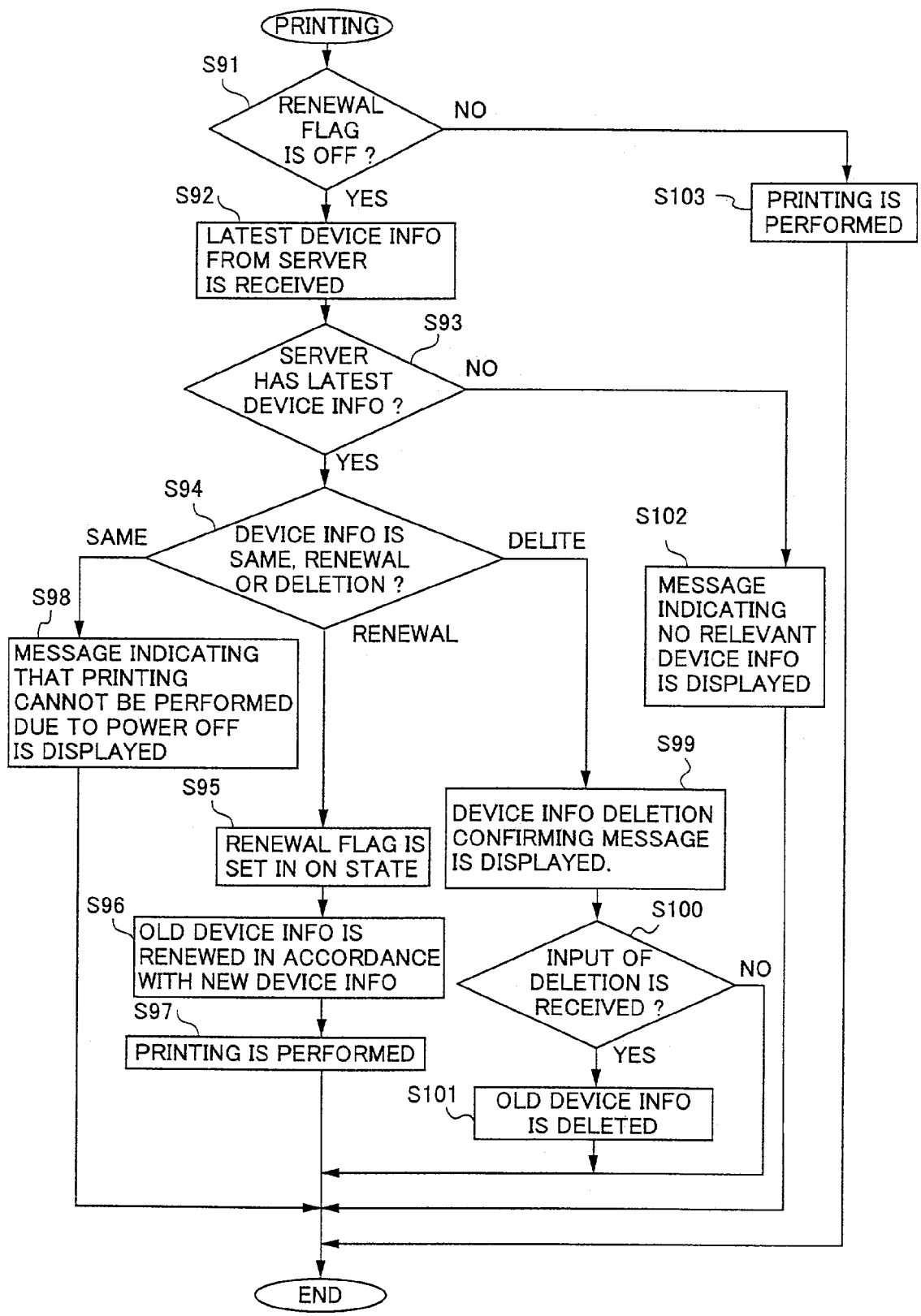
FIG. 14 is a flowchart for explaining a device information renewal processing procedure that is executed by a fourth preferred embodiment of the device information renewal system of the invention.
Figure 15:
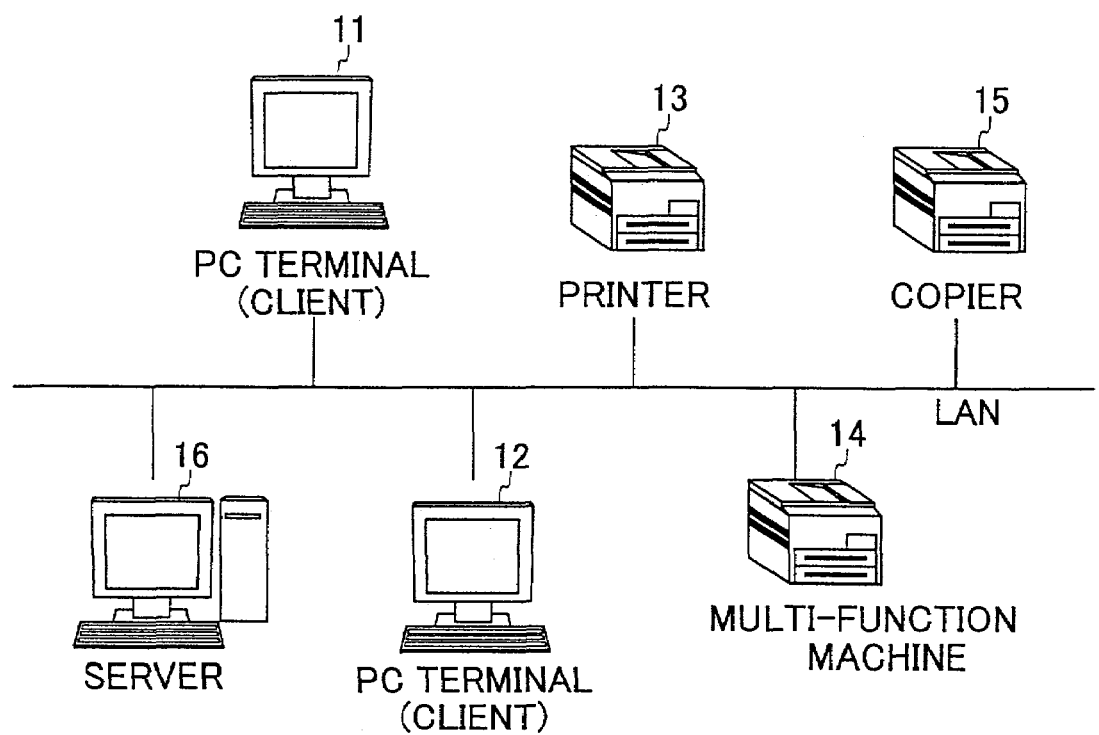
FIG. 15 is a diagram showing the network environment in which a server, a computer and image forming devices, such as a printer, are connected.

Next, FIG. 14 shows a device information renewal processing procedure that is executed by the fourth preferred embodiment of the device information renewal system of the invention. FIG. 15 shows the network environment in which the server 16, the PC terminals 11 and 12, and the image forming devices 13-15 are connected. The server 16 has a configuration that is essentially the same as that of the PC terminal shown in FIG. 2.

In the device information renewal system of the present embodiment that is applied to the network environment shown in FIG. 15, the device information of all the image forming devices (the printer 13, the multi-function machine 14, the copier 15) connected to the network concerned (LAN) is stored into the memory unit of the server 16. The server 16 performs periodically data communications with each of the image forming devices on the network concerned, receives the device information sent by the device information management unit 36 of each device, respectively, and stores the received device information in the memory unit of the server 16.

In the above embodiment of the device information receiving procedure in FIG. 15, the server 16 performs the data communications between the server and all the image forming devices on the network concerned (LAN), and automatically receives the device information sent by the device information management unit 36 of each device, respectively, and stores the received device information into the memory unit of the server 16. The present invention is not limited to this embodiment. Alternatively, a network administrator or each user on the server 16 may manually input the device information of each of the image forming devices related to the network concerned (LAN), instead of using the server's automatic receiving function. In such alternative embodiment, when such device information is input by the network administrator, the server 16 stores the input device information into the memory unit of the server 16.

The execution of the device information renewal processing procedure in FIG. 14 is started by the CPU control unit 22 when the PC terminal 11 is connected to the new network environment (for example, the network environment 5) after the movement to the new network environment, and a printing demand to the printer 13 is received.

At a start of the device information renewal processing procedure in FIG. 14, the PC terminal 11 determines whether the renewal flag of the PC terminal 11 is OFF (step S91).

When the result at the step S91 is negative (NO), it is determined that the device information is already renewed, and the PC terminal 11 performs printing operation of the printer 13 in response to the received printing demand (step S103). After the printing is performed, the procedure of FIG. 14 ends.

When the result at step S91 is affirmative (YES), it is determined that the device information is not yet renewed, and the PC terminal 11 receives the newest device information of each-image forming device on the network concerned, by sending a device information request to the server 16 on the network concerned through the network I/F unit 26 (step S92). The server 16 sends the newest device information in response to the request, which is received by the PC terminal 11. The PC terminal 11 stores the received device information into the memory of the memory unit 24 through the ROM/RAM control unit 21 (step S92).

After the step S92 is performed, the PC terminal 11 determines whether the PC terminal 11 has received the newest device information from the server 16 (step S93). When the result at the step S93 is negative (NO), the check message, which indicates there is no corresponding new device information received from the server 16, is displayed on the display unit (step S102). After the step S102 is performed, the PC terminal 11 ends the processing of FIG. 14.

When the result at the step S93 is affirmative (YES), the PC terminal 11 determines whether the received new device information is the same as the old device information, or the renewal of the old device information using the new device information is needed, or the deletion of the old device information is needed (step S94).

When it is determined that the renewal using the new device information is needed as the result of the step S94, the PC terminal 11 sets the renewal flag in ON state (step S95). And the PC terminal 11 renews the device information registered in the OS of the memory unit 24 in accordance with the new device information (step S96). After the step S96 is performed, the PC terminal 11 performs printing operation of the printer 13 in response to the received printing demand (step S97). After the printing is performed, the procedure of FIG. 14 ends.

On the other hand, when it is determined at the step S94 that the new device information is the same as the old device information, the PC terminal 11 displays the message, which indicates the printing in response to the printing demand cannot be performed due to a power-off state of the printer 13, on the display unit (step S98). After the step S98 is performed, the PC terminal 11 ends the processing of FIG. 14.

There are other factors that are considered as a cause that the printing cannot be performed. For example, when the network address of the printer 13 is changed, or when the printer 13 is abolished, the printing cannot be performed. Also, when any of errors including a toner end, a paper end, or a paper jam, etc., and other hardware failures have occurred in the printer 13, the printing cannot be performed.

Moreover, when it is determined at the step S94 that the deletion of the old device information is needed, the PC terminal 11 displays the deletion check message, which confirms the user to delete the old device information corresponding to the new device information, on the display unit through the input/output device 25, and waits for the input of the confirmation by the user (step S99). The PC terminal 11 determines whether the user inputs the confirmation to delete the corresponding old device information (step S100).

When the result at the step S100 is negative (NO), the PC terminal 11 ends the processing of FIG. 14 without performing the deletion of the old device information. On the other hand, when the result at the step S100 is affirmative (YES), the PC terminal 11 deletes the old device information (step S101). After the step S101 is performed, the procedure of FIG. 14 ends.

As described in the foregoing, according to the device information renewal system of the present invention, when the computer is connected to the second network and the device information received from all the image forming devices connected to the second network, respectively judges that it is in agreement with the old device information about the first network. Since the old device information stored in the corresponding device information as new device information about the second network, and was registered into the OS of the computer according to the new device information is updated. It is possible to automatically renew the device information of the printer registered into the OS of the computer, and it is possible to reduce the network administrator or each user's burden.

The present invention is not limited to the above-described embodiments, and variations and modifications may be made without departing from the scope of the present invention.

Further, the present invention is based on Japanese priority application No. 2001-115539, filed on Apr. 13, 2001, Japanese priority application No. 2001-266551, filed on Sep. 3, 2001, and Japanese priority application No. 2002-104382, filed in Apr. 5, 2002, the entire contents of which are hereby incorporated by reference.

What is claimed is:

1. A device information renewal system for use in a network in which a computer terminal and image forming devices are connected, the computer terminal comprising:

a storing unit receiving, with the computer terminal being connected to a first network, device information of image forming devices on the first network from the image forming devices, the device information being registered into an operating system running on the computer terminal as first device information;

a comparison unit receiving, when the computer terminal connected to the first network is moved and connected to a second network, second device information of all image forming devices on the second network from all the image forming devices and the first network information from the storing unit, and determining whether the second device information matches with the first device information; and a renewal unit renewing the first device information by adding the second device information to the first device information registered in the operating system of the computer terminal when it is determined that the second device information matches with the first device information.

2. A device information renewal system according to claim 1, wherein each of the first device information of image forming devices on the first network and the second device information of all image forming devices on the second network includes a network address and a MAC address of each device.

3. A device information renewal system according to claim 1, wherein each of the first device information of image forming devices on the first network and the second device information of all image forming devices on the second network includes a network address, a model name, and an option composition data of each device.

4. A computer terminal for use in a device information renewal system, wherein the device information renewal system includes:
a storing unit receiving, with the computer terminal being connected to a first network, device information of image forming devices on the first network from the image forming devices, the device information being registered into an operating system running on the computer terminal as first device information;
a comparison unit receiving, when the computer terminal connected to the first network is moved and connected to a second network, second device information of all image forming devices on the second network from all the image forming devices and the first network information from the storing unit, and determining whether the second device information matches with the first device information; and
a renewal unit renewing the first device information by adding the second device information to the first device information registered in the operating system of the computer terminal when it is determined that the second device information matches with the first device information; and
wherein the computer terminal comprises a selection check unit displaying a list of plural image forming devices on the second network when each of the plural image forming devices has one of a model name or an option composition data of the second device information that matches with a corresponding one of the first device information, the selection check unit receiving a user input to select one of the model names or the option composition data of the plural image forming devices from the list.

5. A computer terminal for use in a device information renewal system according to claim 4, wherein the computer terminal comprises a selection check unit displaying a list of plural image forming devices on the second network when each of the plural image forming devices has the second device information that matches with the first device information of the storing unit, the selection check unit receiving a user input to select one of the plural image forming devices from the list, and the comparison unit making the determination of the second device information based on the received user input.

6. A computer terminal for use in a device information renewal system according to claim 4, wherein the comparison unit detects, when the computer terminal receives a printing demand to one of the image forming devices on the second network before receiving the second device information, that a renewal flag is set in OFF state and the renewal unit sets the renewal flag in ON state when the first device information stored in the memory of the terminal is renewed.

7. A device information renewal method for use in a network in which a computer terminal and image forming devices are connected, comprising the steps of:
receiving, with the computer terminal being connected to a first network, device information of image forming devices on the first network from the image forming devices;
registering device information into an operating system running on the computer terminal as first device information;
receiving, when the terminal connected to the first network is moved and connected to a second network, second device information of all image forming devices on the second network from all the image forming devices and the first network information from the operating system of the computer terminal;
determining whether the second device information matches with the first device information; and
renewing the first device information by adding the second device information to the first device information registered in the operating system of the computer terminal when it is determined that the second device information matches with the first device information.

8. A device information renewal method according to claim 7, wherein each of the first device information of image forming devices on the first network and the second device information of all image forming devices on the second network includes a network address and a MAC address of each device.

9. A device information renewal method according to claim 7, wherein each of the first device information of image forming devices on the first network and the second device information of all image forming devices on the second network includes a network address, a model name, and an option composition data of each device.

10. A computer program embodied therein for performing a device information renewal procedure for use in a network in which a computer terminal and image forming devices are connected, said program comprising:
first program code for receiving, with the terminal being connected to a first network, device information of image forming devices on the first network from the image forming devices, the device information being registered into an operating system running on the computer terminal as first device information;
second program code for receiving, when the terminal connected to the first network is moved and connected to a second network, second device information for all image forming devices on the second network from all the image forming devices and the first network information from the operating system of the computer terminal;
third program code for determining whether the second device information matches with the first device information; and
fourth program code means for renewing the first device information by adding the second device information to the first device information registered into the operating system of the computer terminal when it is determined that the second device information matches with the first device information.

11. A computer program embodied therein for performing a device information renewal procedure according to claim 10, wherein each of the first device information of image forming devices on the first network and the second device information of all image forming devices on the second network includes a network address and a MAC address of each device.

12. A computer program embodied therein for performing a device information renewal procedure according to claim 10, wherein each of the first device information of image forming devices on the first network and the second device information of all image forming devices on the second network includes a network address, a model name, and an option composition data of each device.

13. A computer readable medium having a program embodied therein for performing a device information renewal procedure for use in a network in which a computer terminal and image forming devices are connected, said program comprising:

first program code for receiving, with the computer terminal being connected to a first network, device information of image forming devices on the first network from the image forming devices, the device information being registered into an operating system running on the computer terminal as first device information;

second program code for receiving, when the terminal connected to the first network is moved and connected to a second network, second device information of all image forming devices on the second network from all the image forming devices and the first network information from the operating system of the memory of the computer terminal;

third program code for determining whether the second device information matches with the first device information; and fourth program code for renewing the first device information by adding the second device information to the first device information registered in the operating system of the computer terminal when it is determined that the second device information matches with the first device information.

14. A computer program embodied therein for performing a device information renewal procedure according to claim 13, wherein each of the first device information of image forming devices on the first network and the second device information of all image forming devices on the second network includes a network address and a MAC address of each device.

15. A computer program embodied therein for performing a device information renewal procedure according to claim 13, wherein each of the first device information of image forming devices on the first network and the second device information of all image forming devices on the second network includes a network address, a model name, and an option composition data of each device.

* * * * *